(12) United States Patent
Suda

(10) Patent No.: US 6,420,469 B1
(45) Date of Patent: Jul. 16, 2002

(54) ELECTRORHEOLOGICAL FINE PARTICLE-ON-PARTICLE DISPERSION

(75) Inventor: Yasuharu Suda, Hiroshima (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/665,547

(22) Filed: Sep. 19, 2000

Related U.S. Application Data

(62) Division of application No. 09/129,025, filed on Aug. 4, 1998, now abandoned.

(30) Foreign Application Priority Data

Aug. 6, 1997 (JP) .............................. 9-211916

(51) Int. Cl.[7] .......................... C08K 3/38; C08K 3/10; C08K 3/34
(52) U.S. Cl. ..................... 524/405; 523/205; 524/413; 524/449; 524/493
(58) Field of Search .................. 523/205; 524/405, 524/413, 449, 493

(56) References Cited

U.S. PATENT DOCUMENTS

| 3,939,087 A | 2/1976 | Vijayendran et al. |
| 5,695,678 A | 12/1997 | Edamura et al. |

FOREIGN PATENT DOCUMENTS

| EP | 224912 A2 | 6/1987 |
| EP | 540315 A2 | 5/1993 |
| EP | 562978 A1 | 9/1993 |
| EP | 634473 A2 | 1/1995 |
| EP | 823450 A1 | 2/1998 |
| EP | 824227 A1 | 2/1998 |
| JP | 2235994 | 9/1990 |
| JP | 6211961 | 8/1994 |
| JP | 7508047 | 9/1995 |

*Primary Examiner*—Kriellion A. Sanders
(74) *Attorney, Agent, or Firm*—John P. White; Cooper & Dunham LLP

(57) ABSTRACT

A fine particle dispersion consisting essentially of a carrier liquid and fine particles dispersed in the carrier liquid. The fine particles consist essentially of resin or both resin and a coloring material, and have an average particle diameter falling within a range of between 0.5 μm and 20 μm. Inorganic fine particles are attached to or contained in mainly the surface layer of the fine particle.

11 Claims, 1 Drawing Sheet

ELECTRORHEOLOGICAL FINE PARTICLE-ON-PARTICLE DISPERSION

This application is a divisional of U.S. Ser. No. 09/129,025, filed Aug. 4, 1998 now abandoned, claiming priority of Japanese Application No. 9-211916, filed Aug. 6, 1997, the contents of which are hereby incorporated by reference into the subject application.

BACKGROUND OF THE INVENTION

The present invention relates to a fine particle dispersion and a method of manufacturing the same, particularly, to a fine particle dispersion having the viscosity promptly increased upon application of an electric field, exhibiting an electrorheological effect, i.e., the effect that various colors are developed by coloring materials, and acting as an electrorheological (ER) fluid to allow the dispersion to be used as an operating fluid in, for example, an engine mount, a damper and a valve. Since the fine particle dispersion of the present invention is capable of developing various colors, the dispersion can also be used as a coloring material such as a liquid toner and an ink for an ink jet apparatus. The present invention also relates to a method of manufacturing the particular fine particle dispersion.

In the conventional ER fluid of the fine particle dispersion type, the dispersed fine particles have a specific gravity larger than that of the carrier liquid, leading to a poor dispersion of the fine particles.

Also, since a black material such as a carbon black is dispersed in the carrier liquid, the conventional ER fluid cannot be used as a coloring material.

To overcome these difficulties, proposed is an electrorheological (ER) fluid using resin particles having a specific gravity close to that of the carrier liquid. However, the resin particles have a large particle diameter, e.g., about 15 μm. Also, since it is difficult to have both a coloring material and an ER material (material used for imparting an electrorheological effect to the resin particle) buried in the resin particle, an ER fluid using resin particles has not yet been put to practical use.

Under the circumstances, the present inventors previously proposed a liquid toner composition containing a coloring material and resin particles having such a small particle diameter as 2 to 3 μm of a volume-based median diameter, said composition exhibiting the properties of an ER fluid, and also proposed a method of manufacturing the particular liquid toner composition. As a result of a continued effort to improve further the properties of the ER fluid, the present inventors have arrived at the present invention.

BRIEF SUMMARY OF THE INVENTION

An object of the present invention is to provide a fine particle dispersion exhibiting a high ER effect, the dispersion containing resin particles, which may or may not contain a coloring material, having an average particle diameter controlled to fall within a range of between 0.5 and 20 μm and having inorganic particles attached to or contained in, mainly, the surface region thereof, and a method of manufacturing the same.

According to a first aspect of the present invention, there is provided a fine particle dispersion having resin or both resin and a coloring material dispersed in a carrier liquid, the resin being controlled to have an average particle diameter of 0.5 to 20 μm and having inorganic fine particles attached to or contained in, mainly, a surface layer thereof.

According to a second aspect of the present invention, there is provided a method of manufacturing a fine particle dispersion, comprising the steps of:

fusing under heat and dispersing a thermoplastic resin, which may or may not contain a coloring material, in a solvent having a high temperature dependency in terms of solubility of the thermoplastic resin and having its solubility parameter controlled to control the particle diameter of the particles to be precipitated;

cooling the resin-containing system to precipitate the resin particles, which may or may not contain the coloring material;

adding inorganic fine particles to the system, followed by heating again the system to achieve a sufficient mixing; and cooling the system to permit the inorganic fine particles to be attached to or contained in, mainly, the surface layer of the resin particles, which may or may not contain the coloring material.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

The single FIGURE shows an apparatus for evaluating the electrorheological (ER) properties of a fine particle dispersion according to one embodiment of the present invention.

DETAILED DESCRIPTION OF THE INVENTION

Figure 1:
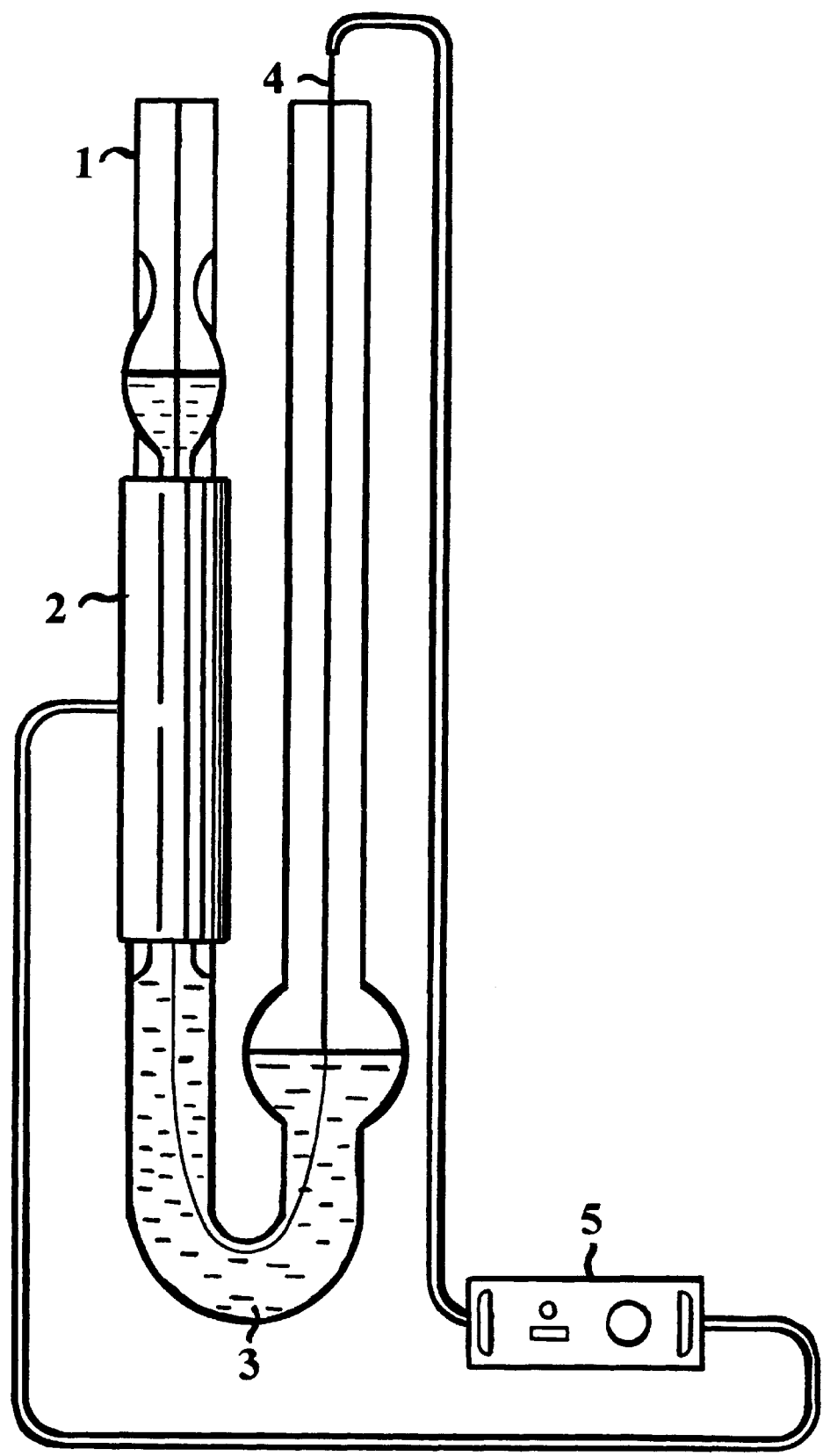

The fine particle dispersion of the present invention contains inorganic fine particles serving to allow the dispersion to produce an electrorheological (ER) effect. To allow the dispersion to produce an ER effect, it is possible for the inorganic fine particles to be present deep inside the particle consisting of resin or resin and a coloring material (hereinafter referred to as a colored resin particle). However, it is desirable for the inorganic fine particles to be present in the vicinity of a surface layer of the resin particle or the colored resin particle. Naturally, it is desirable for the inorganic fine particles to be added selectively in the vicinity of the surface layer of the resin particle or the colored resin particle in order to permit the dispersion of the present invention to produce higher ER properties.

The inorganic fine particles used in the present invention include, for example, titanium-based particles such as titanium oxide particles and hydrous titanium oxide particles; silica-based particles such as silica particles, colloidal silica and silica gel; synthetic mica particles; and aluminum borate particles. The particle diameter and specific surface area of these particles can be determined appropriately, as desired. However, it is desirable for the inorganic fine particles to have a particle diameter falling within a range of between 0.01% and 25% of the diameter of the resin particle or the colored resin particle. Also, it is possible for the surface of the inorganic fine particle to treated with an organic material, a hydroxide, or the like in order to improve the dispersion capability or affinity with the resin of the inorganic fine particles.

The titanium-based particles used as the inorganic fine particles in the present invention include, for example, inorganic fine particles available from Ishihara Sangyo Kaisha Co. under trade names of C-11, TTO-55(A), TTO-55(B), TTO-55(C), TTO-55(S), TTO-51(A), TTO-51(N), inorganic fine particles available from Teika Co. under trade names of MT-100SA, MT-100SAS, MT-150W, X-039, X-040, X-041, and inorganic fine particles available from Sakai Kagaku Co. under trade names of STR-40, STR-60, STR-65 and STR-80.

The silica-based particles used as the inorganic fine particles in the present invention include, for example, aerosils available from Japan Aerosil Co. under trade names of 130, 200, 200SV, 200CF, 300, 300CF, 380, R972, R974, R202, R805, R812, OX50, TT600, MOX80, MOX170, and COK84; particles available from Nissan Kagaku Kogyo K.K. under trade names of IPA-ST and IPA-ST-Z1; particles available from Shokubai Kasei Kogyo K.K. under the trade name of OSCAL-1235; and particles available from Fuji Silica Kagaku K.K. under trade names of CARIACT-15, CARIACT-30 and CARIACT-50.

Further, the synthetic mica used in the present invention as inorganic fine particles include, for example, mica particles available from Corp. Chemical K.K. under the trade name of MK-100. Still further, the aluminum boron particles used as inorganic fine particles in the present invention include, for example, those available from Shikoku Kasei Kogyo K.K. under trade names of PF series and PC series.

Of course, the inorganic fine particles used in the present invention are not limited to those exemplified above.

Since the fine particle dispersion of the present invention is used as a coloring material, it is desirable to use white inorganic fine particles, particularly, fine particles of titanium oxide, hydrous titanium oxide, silica, synthetic mica and aluminum borate. It should be noted that the ER properties of the dispersion can be further improved by applying a surface treatment to these white inorganic fine particles.

It is desirable to use a thermoplastic resin in the fine particle dispersion of the present invention. The thermoplastic resins used in the present invention include, for example, vinyl chloride resin, vinylidene chloride resin, vinyl acetate resin, polyvinyl acetal resin, styrene series resin, methacrylic acid series resin, polyethylene resin, polypropylene resin, fluorocarbon resin, polyamide series resin, polyacetal resin, and saturated polyester resin.

It is particularly desirable to use olefinic resins having a carboxyl group or an ester bond including, for example, ethylene-vinyl acetate copolymer, a partially saponified ethylene-vinyl acetate copolymer, ethylene-acrylic acid copolymer, ethylene-methacrylic acid copolymer, ethylene-acrylic ester copolymer, ethylene-methacrylic ester copolymer, acrylic ester resin, methacrylic ester resin, styrene-acrylic acid copolymer, styrene-methacrylic acid copolymer, styrene-acrylic ester copolymer and styrene-methacrylic ester copolymer. These resins can be used singly or in the form of a mixture of at least two of these resins. In the case of adding a pigment as a coloring material to the resin, the pigment should be added in an amount of 50 to 1% by weight relative to 50 to 99% by weight of the resin.

A pigment used generally in an ink composition or toner can be used as the coloring material in the fine particle dispersion of the present invention. For example, various carbon blacks manufactured by the furnace method, contact method, acetylene method, etc. and available on the market for use as an additive to rubber, for color development and for electrical conduction can be used as a black pigment in the present invention.

To be more specific, it is possible to use carbon blacks manufactured by the furnace method including HCF, MCF, RCF, LCF, and LFF, carbon blacks manufactured by the channel method including HCC, MCC, RCC and LCC, which are classified on pages 290 to 291 of "Carbon Black Binran (Handbook)" published in April, 1995, and various acetylene blacks described on page 294 of "Carbon Black Binran" noted above.

The non-black pigments used in the present invention include, for example, phthalocyanine blue, phthalocyanine green, sky blue, rhodamine lake, malachite green lake, Hansa yellow, benzidine yellow, and brilliant carmine 6B.

The pigments exemplified above can be used together with dyes including, for example, oil-soluble azo dyes such as oil black and oil red; basic azo dyes such as bismark brown; acidic azo dyes such as blue black HF; and quinone imine dyes such as nigrosine. It is also possible to use a so-called processed pigment, i.e., a pigment having the surface coated with resin.

The coloring material can be added to the fine particle dispersion of the present invention by means of kneading under heat in advance with the thermoplastic resin. Alternatively, the coloring material can be added before precipitation of particles in the manufacturing process of the fine particle dispersion so as to allow the coloring material to be mixed and dispersed sufficiently in the solvent and the resin.

In the present invention, it is desirable to use a liquid material having high electrical insulating properties as the carrier liquid. For example, the carrier liquid used in the present invention include straight-chain or branched aliphatic hydrocarbons, alicyclic hydrocarbons, halogen derivatives thereof, and silicone oils. Where the fine particle dispersion of the present invention is used as a liquid toner, it is desirable to use the aliphatic hydrocarbons as the carrier liquid. To be more specific, the carrier liquid used in the present invention include, for example, a silicone oil available from Toshiba Silicone Ltd. under the trade name TSF451, liquid materials available from Exxon Chemical Ltd. under trade names of Isopar G, Isopar H, Isopar K, Isopar L, Isopar M and Isopar V; a liquid material available from Shell Petroleum Ltd. under the trade name of Shellzole 71; and liquid materials available from Idemitsu Petrochemical Co., Ltd. under trade names of IP1620, IP2028 and IP2835.

The solvent used in the present invention is required to dissolve the resin in the heating step and to hardly dissolve the resin at room temperature. Further, the solubility parameter (SP value) of the solvent is controlled so as to control the diameter of the precipitated resin particles or precipitated colored resin particles. It should be noted that the difference $\Delta SP$ value between the SP value of the resin itself and the SP value of the solvent should be as small as possible in order to diminish the diameter of the precipitated resin particles or the precipitated colored resin particles. Either a single solvent or a mixed solvent can be used in the present invention. The solvent used in the present invention includes, for example, straight-chain or branched aliphatic hydrocarbons, halogenated aliphatic hydrocarbons, aromatic hydrocarbons, aliphatic alcohols, and ethers. These solvents can be used singly or in the form of a mixture of at least two of these solvents.

Further, where the fine particle dispersion of the present invention is used as a coloring material, additives may be added as required.

In an ER fluid containing fine resin particles as the base material, it is important to allow the ER material and the resin particles to be made integral like a complex composition. In order to obtain a high ER effect, it is desirable for the ER material to be selectively attached in the vicinity of the surface layer of the resin particle. On the other hand, where the fine particle dispersion exhibiting the ER properties is used as a coloring material, a colorant such as a pigment is required to be contained in the resin particle. In view of the color developing properties, it is desirable for the pigment particles to be dispersed as uniformly as possible in the resin particles. It follows that, when it comes to colored resin particles exhibiting the ER properties, which can also be used as a coloring material, the colorant particles are required to be dispersed uniformly within the resin particles and, at the same time, the ER material is required to be attached in the vicinity of the surface layer of the resin particle.

the mixed solvent noted above, 50 g of "Dumiran C-2280" (trade name of a partially saponified ethylene-vinyl acetate copolymer manufactured by Takeda Pharmaceutical Co., Ltd. and having an SP value of 8.93) and 10 g of phthalocyanine blue (C.I. Pigment Blue 15:3, manufactured by Dai-nichi Seika Kogyo K.K.), which was dispersed in advance in a mixed solvent using Dinomill. The mixture was kept stirred for 30 minutes at 70° C. so as to dissolve completely "Dumiran C-2280" noted above, followed by cooling the solution to room temperature so as to precipitate colored resin particles.

Then, 13 g of the inorganic fine particle dispersion noted above was poured into the container, followed by stirring again the mixture for 30 minutes at 50° C. and subsequently cooling the mixture to room temperature. The mixed solvent of the fine particle dispersion was replaced by Isopar L so as to prepare a fine particle dispersion exhibiting an ER (electrorheological) effect. Table 1 shows the properties of the fine particle dispersion.

TABLE 1

| Example | ER material | Colorant | Carrier liquid | Particle diameter ($\mu$m) | Kinematic viscosity (cSt) 0 kV | Kinematic viscosity (cSt) 2 kV | Zeta potential (mV) | Printing conc. (D) | Gradation reproduction (Visual evaluation) | Overall evaluation of image quality (visual evaluation) |
|---|---|---|---|---|---|---|---|---|---|---|
| 1 | C-11 | Added | Isopar L | 2.7 | 10.4 | 69.7 | — | — | — | — |
| 2 | STR-60 | Added | Isopar L | 2.6 | 11.1 | 89.0 | +108 | 1.4 | Excellent | Excellent |
| 3 | *1 | Added | Isopar L | 2.7 | 11.3 | 118.7 | +101 | 1.4 | Excellent | Excellent |
| 4 | STR-60 | None | TSF 451-1 | 0.8 | 11.0 | 94.6 | — | — | — | — |
| 5 | MK-100 | Added | Isopar L | 10.6 | 12.4 | 96.0 | — | — | — | — |
| 6 | BF-3 | Added | Isopar L | 9.8 | 11.6 | 78.9 | — | — | — | — |
| 7 | OSCAC-1235 | Added | Isopar L | 2.8 | 13.8 | 82.7 | +80 | 1.4 | Excellent | Good to excellent |
| Comparative Example 1 | C-11 | Added | Isopar L | 2.9 | 17.8 | 27.9 | — | — | — | — |
| Comparative Example 2 | STR-60 | Added | Isopar L | 2.5 | 10.7 | 22.5 | +98 | 1.4 | Fair | Fair |

*1: STR-60 treated with titanium hydroxide

As described above, the present invention provides a fine particle dispersion exhibiting a high ER effect, said dispersion containing resin particles, which may or may not contain a coloring material, having an average particle diameter controlled to fall within a range of between 0.5 and 20 $\mu$m and having inorganic particles attached to or contained in, mainly, the surface region thereof, and a method of manufacturing the same.

Let us describe some examples of the present invention. The expressions "parts" and "%" used in the following examples represent "parts by weight" and "% by weight", respectively.

EXAMPLE 1

An inorganic fine particle dispersion was prepared by dispersing 900 parts of C-11 (trade name of hydrated titanium oxide particles manufactured by Ishihara Sangyo Kaisha Ltd. and having a particle diameter of 5 to 10 nm) in 300 parts of a mixed solvent having an SP value of 9.18 and consisting of 48% of Isopar L manufactured by Exxon Chemical Ltd., 32% of toluene manufactured by Katayama Kagaku K.K. and 20% of ethanol manufactured by Katayama Kagaku K.K. using Dinomill KDL-Pilot type, which is a wet mill sold by Sinmal Enterprises Inc.

On the other hand, poured into a container equipped with a stirrer, a thermometer, and a reflux cooler were 1200 g of The particle diameter shown in Table 1 is a volume-based median diameter measured by "LA-700", which is a trade name of a laser diffraction/scattering type particle size distribution meter manufactured by Horiba Seisakusho K.K. The kinematic viscosity (cSt) indicated in Table 1 was measured with an Ostwald viscometer 1 shown in FIGURE. Specifically, an electrode (copper plate) 2 was mounted within the Ostwald viscometer 1. A fine particle dispersion 3 having a particle concentration of 10% was housed in the Ostwald viscometer 1. Further, a bare copper wire 4 having a diameter of 0.2 mm was arranged within the Ostwald viscometer 1 and connected to a high voltage power source 5.

EXAMPLE 2

A fine particle dispersion exhibiting an ER effect was prepared as in Example 1, except that STR-60 (trade name of fine titanium oxide particles manufactured by Sakai Kagaku Kogyo K.K. and having a particle diameter of 0.02 to 0.05 $\mu$m) was used in place of the hydrated titanium oxide C-11 used in Example 1. Then, zirconium naphthenate was added as a charging agent to the fine particle dispersion in an amount of 10% based on the solid component of the dispersion to prepare a positively charged liquid toner. The properties of the liquid toner and the result of evaluation of the image quality are show in Table 1. For evaluating the image quality, images were printed on a coated paper sheet using "Mitsubishi Electronic Printing System", and the image quality was evaluated by visual observation. Further, the printing concentration was measured by using a Macbeth densitometer.

Comparative Example 1

A fine particle dispersion was prepared as in Example 1, except that the inorganic fine particle dispersion was added in the step of adding the resin and pigment in place of adding the inorganic fine particle dispersion after precipitation of the colored resin particles. The properties of the fine particle dispersion are shown in Table 1. As apparent from Table 1, the ER properties were made inferior to those in Example 1 because the ER material of the inorganic fine particles is dispersed within the resin particle together with the pigment.

Comparative Example 2

A liquid toner was prepared as in Example 2, except that the inorganic fine particle dispersion was added in the step of adding the resin and pigment in place of adding the inorganic fine particle dispersion after precipitation of the colored resin particles. The properties of the liquid toner and the result of evaluation of the image quality are shown in Table 1. As apparent from Table 1, the image quality was made inferior to that in Example 2 because the ER properties were impaired in Comparative Example 2.

EXAMPLE 3

A liquid toner was prepared as in Example 2, except that inorganic fine particles manufactured by Sakai Kagaku K.K. and having a particle diameter of 0.02 to 0.05 $\mu$m, which was prepared by treating the surface of STR-60 (titanium oxide fine particles used in Example 2) with titanium hydroxide in an amount of 10% based on the weight of STR-60, was used in place of STR-60 used in Example 2. The properties of the liquid toner and the result of evaluation of the image quality are shown in Table 1.

EXAMPLE 4

An inorganic fine particle dispersion was prepared by dispersing 900 parts of STR-60 (titanium oxide fine particles) in 300 parts of a mixed solvent consisting of 50% of Isopar L, 33% of toluene, and 17% of ethanol by using Dinomil. On the other hand, poured into a container equipped with a stirrer, a thermometer and a reflux cooler were 1,200 g of the mixed solvent noted above and 50 g of Dumiran C-2280. The mixture was kept stirred for 30 minutes at 70° C. to dissolve Dumiran C-2280 completely, followed by cooling the solution to room temperature to precipitate the resin particles. Then, 8.3 g of the inorganic fine particle dispersion noted above was poured into the container, followed by stirring again the mixture for 30 minutes at 50° C. and subsequently cooling the mixture. The mixed solvent of the fine particle dispersion was replaced by "TSF451-1", which is a trade name of a solvent manufactured by Toshiba Silicone K.K. so as to prepare a fine particle dispersion exhibiting an ER effect. The properties of the fine particle dispersion are shown in Table 1.

EXAMPLE 5

An inorganic fine particle dispersion was prepared by adding 900 parts of MK-100, which is a trade name of synthetic mica particles having a particle diameter of 1 to 5 $\mu$m, to 300 parts of a mixed solvent having an SP value of 9.89 and consisting of 40% of Isopar L, 27% of toluene, and 33% of ethanol. The mica particles added to the mixed solvent were pulverized by Dinomil to allow the dispersion to contain mica particles having a diameter of 0.5 to 2 $\mu$m. On the other hand, poured into a container equipped with a stirrer, a thermometer, and a reflux cooler were 1,200 g of the mixed solvent noted above, 50 g of Dumiran C-2280, and 10 g of brilliant carmine 6B (C.I. Pigment Blue 57:1, manufactured by Dai-nichi Seika Kogyo K.K.), which was dispersed in advance in said mixed solvent using Dinomil. The mixture was kept stirred for 30 minutes at 70° C. to dissolve completely Dumiran C-2280, followed by cooling the resultant solution to room temperature so as to precipitate colored resin particles. Then, 10 g of the inorganic fine particle dispersion noted above was added to the system and the system was kept stirred again at 50° C., followed by cooling the system to room temperature. The mixed solvent of the fine particle dispersion was replaced by Isopar L so as to prepare a fine particle dispersion exhibiting an ER effect. The properties of the fine particle dispersion are also shown in Table 1.

EXAMPLE 6

A fine particle dispersion exhibiting an ER effect was prepared as in Example 5, except that PF-03, which is a trade name of aluminum borate manufactured by Shikoku Kasei Kogyo K.K. and having a particle diameter of 3 $\mu$m, was used in place of the synthetic mica MK-100 used in Example 5 in preparing an inorganic fine particle dispersion containing inorganic fine particles having a particle diameter of 1 $\mu$m. The properties of the fine particle dispersion are shown in Table 1.

EXAMPLE 7

A liquid toner was prepared as in Example 2, except that 10 g of OSCAL-1235, which is a trade name of silica sol manufactured by Shokubai Kasei Kogyo K.K., in place of the inorganic fine particle dispersion used in Example 2. The properties of the liquid toner and the result of evaluation of the image quality are shown in Table 1.

As apparent from the Examples described above, a mixture of a pigment and resin is kneaded, or a dispersing agent is added in the present invention to permit the pigment to be dispersed sufficient in the solvent. As a result, the pigment is uniformly contained in the resin particle in precipitating the colored resin particles. Then, inorganic fine particles acting as an ER material are added, followed by mixing under heat the ER material with the colored resin particles. In this heating step, the resin surface layer of the colored resin particle is swollen. Because of the interaction with the swollen resin surface layer, the pigment particles are selectively attached to the surface of the colored resin particle. Then, the system is cooled, with the result that the inorganic fine particles are fixed to the surface of the colored resin particle. These inorganic fine particles fixed to the surface layer of the colored resin particle are hardly released from the colored resin particle, even if various treatments are applied to the fine particle dispersion depending on various uses of the fine particle dispersion.

What should also be noted is that, since the ER material is selectively attached to the surface layer of the colored resin particle, the fine particle dispersion of the present invention is enabled to exhibit high ER properties. In addition, since the coloring agent is uniformly contained inside the resin particle, the fine particle dispersion of the present invention can also be used as a coloring material.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method for manufacturing electrorheological fine particle-on-particle dispersion, comprising the steps of:

fusing under heat and dispersing a thermoplastic resin containing a coloring material, with a mixture ratio of resin 50 to 99% and coloring material 50 to 1%, in a solvent which dissolves the resin when heated but does not dissolve the resin at room temperature, wherein a difference ΔSP value between a solubility parameter (SP) value of the resin itself and the SP value of the solvent is adjusted to be within +0.96;

cooling said resin-containing system to precipitate the coloring-material-containing resin particles;

adding inorganic fine particles to the system, followed by heating again the system to achieve a sufficient mixing; and cooling the system to permit said inorganic fine particles to be attached to or contained in surface layers of the coloring-material-containing resin particles.

2. The method according to claim 1, wherein said inorganic fine particles are selected from the group consisting of titanium-based fine particles, silica-based fine particles, synthetic mica fine particles, aluminum borate fine particles, and surface-treated fine particles thereof.

3. The method according to claim 1, wherein the surface of said inorganic fine particle is treated with an organic material or a hydroxide.

4. The method according to claim 1, wherein the diameter of said inorganic fine particle is 0.01 to 25% of the diameter of said resin particle or coloring material particle.

5. The method according to claim 2, wherein said titanium-based fine particles are selected from the group consisting of titanium oxide fine particles and hydrated titanium oxide fine particles.

6. The method according to claim 2, wherein said silica-based fine particles are selected from the group consisting of silica fine particles, colloidal silica fine particles and silica gel fine particles.

7. The method according to claim 1, wherein said carrier liquid is selected from the group consisting of straight-chain or branched aliphatic hydrocarbons, alicyclic hydrocarbons, halogen-derivatives of these hydrocarbons, and silicone oil.

8. The method according to claim 1, wherein said coloring material consists of pigments used in an ink composition or toner.

9. The method according to claim 1, wherein said coloring material is added in an amount of 50 to 1% by weight relative to 50 to 99% by weight of resin.

10. The method according to claim 1, wherein said resin is a thermoplastic resin.

11. The method according to claim 1, wherein said resin is an olefinic resin having a carboxyl group or an ester bond.

* * * * *